United States Patent [19]

Moczygemba et al.

[11] 4,076,914
[45] Feb. 28, 1978

[54] TREATMENT OF COUPLED POLYMERS PRIOR TO HYDROGENATION

[75] Inventors: George A. Moczygemba; Henry L. Hsieh, both of Bartlesville, Okla.

[73] Assignee: Phillips Petroleum Company, Bartlesville, Okla.

[21] Appl. No.: 694,121

[22] Filed: Jun. 8, 1976

[51] Int. Cl.$^2$ ............................................. C08F 8/04
[52] U.S. Cl. ................................. 526/25; 260/880 R; 260/880 B; 526/26; 526/29; 526/47; 526/47.3
[58] Field of Search ..................... 526/25, 26, 29, 48, 526/47; 260/880 R, 880 B

[56] References Cited

U.S. PATENT DOCUMENTS

| 2,833,749 | 5/1958 | James et al. | 526/29 |
| 2,864,809 | 12/1958 | Jones et al. | 260/85.1 |
| 2,975,160 | 3/1961 | Zelinski | 260/83.7 |
| 2,997,453 | 8/1961 | Short et al. | 260/45.5 |
| 3,113,986 | 12/1963 | Breslow et al. | 260/683.9 |
| 3,317,503 | 5/1967 | Naylor | 260/94.3 |
| 3,350,380 | 10/1967 | Strobel | 260/94.7 |
| 3,468,972 | 9/1969 | Hsieh | 526/29 |
| 3,492,369 | 1/1970 | Naylor | 260/879 |
| 3,513,152 | 5/1970 | Hogan | 260/94.9 |
| 3,852,252 | 12/1974 | DeVault et al. | 260/85.1 |

FOREIGN PATENT DOCUMENTS

| 21,224 | 4/1972 | Australia | 526/25 |
| 1,245,797 | 9/1971 | United Kingdom | 526/25 |

OTHER PUBLICATIONS

Encyclopedia of Polymer Science & Technology; pp. 557–568, 1967.

Primary Examiner—William F. Hamrock

[57] ABSTRACT

An organopolyhalide-coupled conjugated diene polymer is treated with an organometal compound after the coupling step and prior to hydrogenation. The treated polymer is hydrogenated to result in hydrogenated polymers exhibiting low residual unsaturation.

31 Claims, No Drawings

TREATMENT OF COUPLED POLYMERS PRIOR TO HYDROGENATION

FIELD OF THE INVENTION

The invention pertains to methods of treatment of polymers to reduce the unsaturation thereof. In a further aspect, the invention pertains to processes for the hydrogenation of polymers.

BACKGROUND OF THE INVENTION

In the formation of coupled polymers, an alkali metal- or alkaline earth metal-terminated polymer is treated with a multifunctional compound containing two or more reactive sites capable of reacting with the carbon-metal bonds of the alkaline earth- or alkali metal-terminated polymer. The multifunctional compound affords a nucleus for the resulting coupled polymer, producing a molecular structure possessing a nucleus from which radiate long-chain branches attached to the nucleus via the coupling reaction. Polymers derived from difunctional coupling agents are linear, while coupled polymers derived from coupling agents possessing three or more reactive sites are termed "radial polymers." Coupled polymers, particularly, the radial polymers, have been of particular value because of the improvements in Mooney viscosity, processability, and reduction in cold flow that these polymers exhibit relative to their respective parent uncoupled polymers.

Hydrogenation of such coupled polymers has received considerable attention, since removal of unsaturation within the rubbery polymers improves the polymer resistance to environmental attack, e.g., from oxygen and/or ozone. Effectiveness of the hydrogenation, and the value of the resultant hydrogenated polymer, inherently is dependent upon the reasonable completeness of the hydrogenation, otherwise significant degrees of unsaturation would remain available as points for degradative environmental attack. Contaminants that impede hydrogenation theoretically can be removed by repeated coagulation, recovery, purification by various means such as molecular sieves, redissolution and the like, of the polymer. These treatments can be expensive, and in themselves may introduce contaminants because of traces of oxygen, moisture and the like in the solvents used.

At the same time, improvements have been sought with regard to minimizing conditions, such as hydrogenation times, and the like. Minimizing exposure of the polymer to peak hydrogenation temperatures by minimizing hydrogenation times assists in avoiding breakdown of the polymer during hydrogenation, thus maintaining, as far as possible, benefits obtained from the increase in molecular weight, increased Mooney values, obtained through the coupling procedures.

BRIEF SUMMARY OF THE INVENTION

We have discovered a method of pretreatment of solutions of organopolyhalide-coupled polymers whereby subsequent hydrogenation can be conducted so as to obtain very low residual olefinic unsaturation in the polymer.

In accordance with our invention, we treat solutions of organopolyhalide-coupled conjugated diene polymers with an organometal compound wherein the metal thereof is lithium, sodium, potassium, magnesium, calcium, zinc, or aluminum, prior to introduction of the hydrogenation catalyst. This pretreatment results in very low residual olefinic unsaturation in the hydrogenated polymer.

DETAILED DESCRIPTION OF THE INVENTION

In accordance with one aspect of our invention, solutions of organopolyhalide-coupled conjugated diene polymers are pretreated with an organometal compound selected from the group consisting of organolithium compounds, organosodium compounds, organopotassium compounds, organomagnesium compounds, organocalcium compounds, organozinc, and organoaluminum compounds, prior to the hydrogenation step.

Our process is applicable to the organopolyhalide-coupled conjugated diene polymers, including both linear and radial, formed by the reaction of a corresponding alkali metal- or alkaline earth metal-terminated polymer chain with an organopolyhalide coupling agent. The term "conjugated diene polymers" includes conjugated diene homopolymers, conjugated diene copolymers, and copolymers of a conjugated diene with a copolymerizable comonomer, wherein such polymers, if isolated, would be characterized as rubbery. The copolymers include those exhibiting a block structure including tapered blocks, and random blocks, as well as homopolymeric blocks.

Treating Agents

Organometal compounds suitable as treating agents in accordance with our invention can be described by the formula:

$$R_aH_bM$$

wherein M is lithium, sodium, potassium, magnesium, calcium, zinc, or aluminum; R is a hydrocarbyl radical of 1 to 12 carbon atoms selected from linear alkyl, branched alkyl, cycloalkyl, aryl, and combinations thereof including alkaryl and aralkyl, such that the R's can be the same or different and such that the total number of carbon atoms per molecule is not more than about 20; H is hydrogen, and the values of $a$ and $b$ depend on the identity of M, with $a$ being an integer of 1 to 3 and $b$ being 0 or an integer of 1 or 2 depending on the valence of M. When M is lithium, sodium, or potassium, then $a$ is equal to 1 and $b$ is equal to 0. When M is magnesium, zinc, or calcium, then $a$ is equal to 2 and $b$ is equal to zero. When M is aluminum, then $a$ is equal to 1, 2, or 3 and $b$ is equal to 2, 1, or 0 such that the sum of $a$ and $b$ is 3.

Examples of such compounds include methyllithium, n-butyllithium, sec-butyllithium, tert-butyllithium, n-dodecyllithium, di-n-amylmagnesium, dimethylmagnesium, diethylmagnesium, n-amylsodium, 2-ethylhexylpotassium, trimethylaluminum, triethylaluminum, di-n-butylaluminum hydride, 2-ethylhexylaluminum dihydride, triphenylaluminum, benzyllithium, p-tolylsodium, cyclohexyl-bis(2-ethylpentyl)aluminum, diethylzinc, di-n-amylcalcium, dimethylcalcium, and diethylcalcium.

Presently preferred for most effective results are the treating agents wherein M is lithium, sodium, or potassium, and, of these, lithium is presently most preferred due to results obtained.

The treatment of the conjugated diene polymer with the organometal treating agent in accordance with the method and process of our invention is conducted with a polymer in the form of a solution or dispersion of the polymer in a suitable diluent (sometimes referred to as a cement in the art). Conveniently, the solvent employed can be that in which the polymer itself is produced. The solvent or diluent is a hydrocarbon, aliphatic, cycloaliphatic, or aromatic, such as cyclohexane, hexane, methylcyclohexane, benzene, toluene, isooctane, n-heptane, and the like, alone or in various admixture. Hydrocarbons containing active hydrogen atoms such as allylic hydrogen atoms are not recommended because of possible reaction with the treating agent.

While the concentration of the polymer in the solvent or diluent can vary widely, a present convenient and exemplary broad range is about 1 to 50 weight percent polymer relative to total weight of polymer and solvent. Presently preferred is a range of about 5 to 25 because the viscosity of the solution is low enough to be conveniently handled and stirred for adequate temperature control and mixing.

It is convenient and presently preferred to employ the organometal treating agent as a solution or dispersion in a suitable solvent or diluent, such as a nonaromatic solvent such as n-heptane, cyclohexane and the like, since such treating agents often are commercially available in such solvents. However, aromatic solvents are operable. The concentration of organometal treating agent of such as about 0.1 to 2 molar can be considered exemplary and suitable, though lesser or greater concentrations are operable.

The polymer, solution and the organometal treating agent in its solvent can be admixed in any convenient manner, such as in a closed reactor means under an inert gas blanket, or the like, allowing sufficient reaction temperature and time to provide the desired improvement in the hydrogenation conditions desired.

The amounts of the organometal treating agent employed and the treating conditions can vary widely, and should be in that amount and to that degree effective, at a reaction temperature effective, and for a time effective, to produce the desired ultimate reduction in polymer unsaturation. Presently recommended is a broad range of organometallic treating agent of about 0.1 to 25 gram millimoles per 100 grams of polymer, presently preferred about 1 to 10.

An exemplary temperature range broadly is in the range of about 10° C. to 110° C., presently preferred about 20° to 90° C. because of convenience and reaction efficiency. Reaction times can vary widely, and considered exemplary is a time in the range of about 0.1 to 60 minutes or more, presently preferred about 1 to 20 minutes because it is sufficient to be satisfactorily effective and short enough to be reasonably economical. Pressures, of course, can range widely, but usually employed and convenient are temperatures suitable to maintain reactants and diluent in the liquid phase.

Thereafter, the so-treated polymer solution is hydrogenated under conditions effective to substantially remove olefinic unsaturation without affecting to any substantial degree aromatic unsaturation, if any, derived from the use of monovinylarene copolymers, if any. However, under strenuous conditions, aromatic unsaturation can be removed, if desired. Hydrogenation can be effected in the presence of a variety of catalysts of either heterogeneous or homogeneous types.

Examples of appropriate heterogeneous hydrogenation catalyst systems include such as nickel on Kieseluhr, Raney nickel, copper chromite, molybdenum sulfite, or finely divided noble metals such as platinum on a high surface area carrier such as carbon.

Homogeneous hydrogenation catalysts presently are preferred, however, suitable homogeneous catalysts can be prepared by treating (A) a cobalt, nickel or iron carboxylate or alkoxide with (B) an aluminum alkyl compound. Exemplary (A) nickel or cobalt or iron carboxylates or alkoxides include the appropriate acetate, propionate, benzoate, octoate, butoxide, isopropoxide, and the like, alone or in admixture. These catalyst components can be represented by $(RCOO)_d M'$ or $RCH_2OM'$ wherein $M'$ is nickel, cobalt, or iron, and R is previously described; and wherein $d$ is 2 or 3. The (B) aluminum alkyl compounds include such as triisobutylaluminum, triethylaluminum, tripropylaluminum, triisopropylaluminum, tri-n-octylaluminum, and the like, alone or in admixture. These can be represented by $R_3Al$ wherein R is as previously described. An example of a presently preferred homogeneous catalyst is that formed by the reaction or reduction of nickel octoate by triethylaluminum.

The molar ratio of the (A):(B) iron or nickel or cobalt carboxylate or alkoxide:alkylaluminum exemplarily should be in the range of about 0.15:1 to 1:1, preferably about 0.25:1 to 5:1, because of convenience and efficiency.

Hydrogenation with the homogeneous hydrogenation catalysts can employ a wide range of catalyst concentration such as in the range of about 0.1 to 20 gram millimoles nickel or cobalt or iron compound per one hundred grams polymer, preferably about 1 to 10 gram millimoles. Solutions of these compounds in suitable diluents commonly can be employed at concentrations of about 0.5 to 1.5 molar. Most preferably and conveniently, the homogeneous catalyst components are admixed prior to contacting the polymer solution, although they can be added separately where necessary.

Hydrogenation using heterogeneous catalyst systems generally are conducted at liquid hourly space velocities in the range of about 1.0 to 10, preferably 0.5 to 2.

Hydrogenation conditions include hydrogenations in a hydrocarbon diluent, and conveniently this can be the same as employed for the treatment step described above with the organometallic treating agents. Convenient to employ is the same diluent as employed for the polymerization step, thus permitting polymerization, treatment with the organometallic treating agent, and hydrogenation, in the same diluent.

Exemplary hydrogenation temperatures range widely, but presently considered exemplary are temperatures in the range of about 0° C to 250° C., presently preferred about 10° C. to 200° C. because of convenience and efficiency. Hydrogen pressurization of the reaction means can vary widely, though exemplary is pressurization up to a total pressure of about 1,000 psig (6,900 kPa) or more, presently preferred about 10 to 500 psig (69 to 3,450 kPa) because of convenience and efficiency. Reaction times employed can vary widely, such as from about 1 minute to many hours such as 25 hours or more, presently practiced about 10 minutes to 10 hours because of convenience, efficiency and economy.

Upon completion of the hydrogenation reaction, the hydrogenated polymer can be isolated by conventional methods. For example, the catalyst components can be converted to water-soluble salts and washed from the polymer solution. An antioxidant such as 2,6-di-t-butyl-4-methylphenol or 2,2-methyl-enebis(4-methyl-6-t-burylphenol) can be added, if desired, followed by coagulation of the polymer with a lower alcohol or the like, filtration or decantation to recover the polymer, and, where desired, removal of solvent traces by such as reduced pressure treatment and conventional drying operations.

EXAMPLES

The examples presented are a portion of our disclosure and are intended to assist one skilled in the art to which the invention appertains to reach an understanding of our invention. Particular components used, relationships, amounts of materials, and particular conditions, are considered exemplary and not intended to be limitative of the reasonable scope of our invention including our overall disclosure including claims.

EXAMPLE I

As control run 1, a polymer was hydrogenated, in the absence of the inventive practice, employing the following recipe. This polymer was a linear block copolymer of structure 15/70/15 styrene/1,3-butadiene/styrene initiated by n-butyllithium, dichain-coupled by bis(4-chloromethylphenyl) ether, and characterized by the following analysis.

| Polymer Analysis | |
|---|---|
| Inherent viscosity[a] | 0.79 |
| Weight average molecular weight[b] | 81,000 |
| Number average molecular weight[b] | 62,000 |
| Total styrene, wt. %[c] | 30.8 |
| Block styrene, wt. %[d] | 22.6 |
| Trans unsaturation, wt. %[e] | 40 |
| Vinyl unsaturation, wt. %[e] | 38 |

[a] Inherent viscosity was determined in accordance with U.S. 3,278,508, column 20, note a, with the modification that the solution was not filtered through a sulfur absorption tube but rather a sample of the solution was filtered through a fritted glass filter stick of grade C porosity and pressured directly into the viscometer.
[b] Weight average molecular weight, $M_w$, and number average molecular weight, $M_n$, each were determined by gel permeation chromatography in accordance with the method of Kraus, G. and Stacy, C. J., J. Poly. Sci. Symposium No. 43, 329-343 (1973).
[c] Determined by ultraviolet adsorption spectroscopy.
[d] Determined essentially by method of Kolthoff, I. M., Lee, T. S., and Carr, C. W., 1 J. Polymer Sci., 429 (1946).
[e] Polybutadiene microstructure was determined by infrared absorption spectroscopy. The values given were normalized to apply only to the butadiene-based portion of the polymer.

A solution of this polymer in 860 php (parts by weight per hundred of polymer) cyclohexane was added to a stirred reactor, warmed to 70° C., and 0.5 php nickel hydrogenation catalyst was added. This catalyst had been preformed by the reduction of nickel octanoate by triethylaluminum at a 2/1 aluminum/nickel atom ratio. Hydrogen then was admitted and supplied at 50 psig (345 kPa) as the hydrogenation mixture was stirred and maintained at 70° C. for 3 hours. Hydrogen consumption was monitored by pressure drop in the supply cylinder.

Following hydrogenation, the hydrogenated polymer was recovered by coagulation in isopropyl alcohol and solvent traces were removed at reduced pressure. Residual unsaturation was determined as indicated in Table I.

Run 2: The procedure of Run 1 was modified in that prior to the introduction of the hydrogenation catalyst, the polymer solution was contacted vigorously with n-butyllithium, 3.2 gram millimoles per hundred grams of polymer, at 70° C. for 5 minutes. No separation of any kind was attempted following this treatment according to our invention and the procedure of Run 1 was resumed. The evaluation of the polymer produced in Run 2 appears below in Table I.

Run 3: The procedure of Run 1 was modified in that prior to the introduction of the hydrogenation catalyst the polymer solution was contacted vigorously with triethylaluminum, 8.5 gram millimoles per hundred grams of polymer, at 70° C. for 5 minutes. No separation of any kind was attempted following this treatment according to our invention and the procedure of Run 1 was resumed. The evaluation of the polymer produced in Run 3 appears below in Table I.

Table I

| Run No. | Treating Agent Compound | mhp[1] | Hydrogen psig drop in 3 hrs[2] | Unsaturation, Trans | wt. %[3] Vinyl |
|---|---|---|---|---|---|
| 1 | none | none | 20 | 13.6 | 3.6 |
| 2 | n-C$_4$H$_9$Li | 3.2 | 38 | 0.5 | —[4] |
| 3 | Al(C$_2$H$_5$)$_3$ | 8.5 | 23 | 5.4 | —[5] |

[1] Gram millimoles per hundred grams of polymer
[2] In supply cylinder
[3] Polymer microstructure was determined by infrared spectroscopy
[4] None detected
[5] Trace amount detected From the data shown in Table I, it is clear that our prehydrogenation treatment as in Runs 2 and 3 is highly effective in promoting completeness of hydrogenation. The increased drop in hydrogen pressure of inventive Run 2 as compared to control Run 1, and the very large reduction in residual unsaturation shown in Run 2, demonstrate clearly the unexpectedly effective results obtained from our invention. Further, it can be noted that in these comparisons that n-butyllithium Run 2 was more effective than triethylaluminum Run 3, though triethylaluminum did give substantial improvement in the decrease in residual unsaturation as compared to control Run 1.

Polymers

The polymers employable in the process of our invention generically are the conjugated diene polymers, of a rubbery character, prepared by the anionic solution polymerization of one or more conjugated dienes alone, or with one or more copolymerizable vinylidine group-containing comonomers, either in admixture or by sequential monomer addition, employing an organoalkali metal or organoalkaline earth metal initiator under anionic solution polymerization conditions of temperature, time and pressure.

Suitable monomers include the acyclic conjugated dienes, ordinarily containing 4 to 12 carbon atoms per molecule, and monovinylarenes, such as those of 8 to 18 carbon atoms per molecule. Exemplary monomers include the presently preferred 1,3-butadiene and 2-methyl-1,3-butadiene (isoprene), optionally with styrene, as well as 2,3-dimethyl-1,3-butadiene, 1,3-pentadiene, 1,3-octadiene, 2-phenyl-1,3-butadiene, and 3-n-butyl-1,3-octadiene. Copolymerizable vinylidine group-containing monomers include various of the substituted styrenes, 4-cyclohexylstyrene, 3-methylstyrene, 4-propolystyrene, p-tolylstyrene, and monopropenylbenzenes; vinylnaphthalenes such as 1-vinylnaphthalene, 1-vinyl-5-hexylnaphthalene, and the like; as well as vinylpyridines, vinylquinolines, vinylisoquinolines, and the like; all well known to be polymerizable or copolymerizable as described to provide rubbery conjugated diene polymers.

Suitable polymerization initiators include the hydrocarbylmonoalkali metal or alkaline earth compounds of the formula $R'_aM$ wherein $R'$ is a hydrocarbyl radical and is an aliphatic, cycloaliphatic, aromatic, or combination radical; M is an alkali metal, calcium, or magnesium; and $a$ is 1 or 2 corresponding to the valence of M. The R' radicals typically contain such as 1 to 20 carbon atoms. Examples of these hydrocarbyl-monolithium compounds include methyllithium, isopropyllithium, n-butyllithium, sec-butyllithium, t-octyllithium, n-dodecyllithium, n-eicosyllithium, phenyllithium, naphthyllithium, p-tolyllithium 4-phenylbutyllithium, cyclohexyllithium, and cyclobutyllithium. Equivalent sodium, potassium, rubidium or cesium compounds also can be utilized, though lithium compounds presently are preferred. Equivalent alkaline earth metal compounds of calcium or magnesium also can be used wherein, of course, $a$ is 2. The amount of initiator typically is in the range of about 0.1 to 100 gram millimoles per 100 grams of monomer, preferably about 0.1 to 20.

Polymerization conditions known in the art can be employed, typically polymerizing in hydrocarbon diluents as herein discussed, employing temperatures in the range of about $-50°$ C. to $200°$ C., preferably about $15°$ C. to $150°$ C., more preferably about $40°$ C. to $80°$ C., at pressures generally sufficient to maintain the polymerization admixture including diluent substantially in the liquid phase, for a suitable reaction time for generally substantially complete polymerization, such as a few minutes to several hours. Polymerization diluents can be hydrocarbons, paraffinic, cycloparaffinic, or aromatic, presently conveniently of 4 to 10 carbon atoms per molecule. Examples include n-hexane, n-heptane, butane, 2,2,4-trimethylpentane, cyclohexane, benzene, toluene, and the like, alone or in admixture.

At the conclusion of polymerization, the living polymer containing carbon-metal end groups is treated with a treating agent or coupling agent effective to couple the polymer-M moiety so as to produce coupled linear or branched polymers of increased molecular weight. The coupling agent thus is added prior to the addition to the polymer solution of any material, such as water, acid or alcohol, which would deactivate and/or remove the alkali metal or alkaline earth metal atoms present in the polymer.

Compounds suitable for use as the coupling agent are the organopolyhalides containing at least two active halogen atoms which are chlorine, bromine, or both, and which halogen atoms present are bonded to carbon atoms. The molecular structure of the coupling agent can vary widely and can include elements other than carbon and halogen with the total number of nonhydrogen atoms per coupling agent molecule preferably not exceeding about 25. The halogen atoms can be chlorine and/or bromine with at least 2 halogen atoms being present per molecule. While no exact upper limit exists for the number of halogen atoms suitable per coupling agent molecule, more than about 6 halogen atoms would be expected to provide little further coupling effectiveness and, while acceptable, are not particularly recommended.

These polyhalide coupling agent compounds can be described generically by the formula:

wherein X is a chlorine or bromine atom, and wherein R" represents groups that are predominantly but need not be exclusively hydrocarbyl in character, and wherein $m$ is an integer of at least 2 such that at least a second or more chlorine and/or bromine atoms are present which second or more chlorine or bromine atoms are each attached to carbon atoms that can be but preferably are not either aryl or vinyl carbon atoms. These R" groups can include those described as alkyl, cycloalkyl, aryl, and combinations thereof such as alkaryl, aralkyl, and the like, including alkenyl, alkylene, cycloalkenyl, cycloalkylene, arylene, and the like. The R" groups need not be exclusively hydrocarbyl nor simply hydrocarbyl but can contain other atoms, e.g., silicon or tin, to which other groups including chloro- or bromohydrocarbyl groups can be attached.

Examples of suitable coupling agents include methylene chloride, 1,4-dichlorobutane, 1,4-dichloro-2-butene, ethyltrichlorosilane, 1,3-dichloro-2-propanone, 3,5,5-tribromo-4-octanone, 1,3,5-tri(2-bromoethyl)benzene, benzyltribromosilane, 2,5,6,9-tetrachloro-3,7-decadiene, pentachlorocyclohexyl chloromethyl ether, tetra(2-chloroethyl)stannane, 2-chloro-4-bromo-5-phenylpentyl pentachlorophenyl ether, and bis(4-chloromethylphenyl) ether. Mixtures of coupling agents can also be employed. In accordance with this invention, bromine-containing coupling agents are suitable for use in systems where less than about 1 phm vinyl promoter such as ether or amine is present. This limitation does not apply with chlorine-containing coupling agents which lack bromine.

Generally, the amount of polyhalide coupling agent employed is in the range of about 0.1 to 1.5 equivalents of coupling agent based upon the alkali metal or alkaline earth metal, such as lithium, present in the uncoupled polymer. One equivalent of coupling agent generally is presently considered to be the optimum amount for maximum coupling efficiency. The temperature at which the coupling reaction is carried out can vary over a broad range, and for convenience, is often the same as the temperature employed for the polymerization. Although the temperature can vary broadly from such as 0° to 150° C., it will usually be within the range of about 20° C. to 100° C. The coupling reaction normally occurs substantially as soon as the materials are blended and the reaction period thusly is relatively quite short, for example in the range of 1 minute to 1 hour. Longer reaction periods are required at the lower temperatures.

After the coupling reaction, the coupled polymers to be hydrogenated customarily heretofore have isolated by treatment with agents containing active hydrogen atoms such as alcohols or water or aqueous acid solutions or mixtures thereof or similar reagents. But, by practicing our inventive prehydrogenation treatment, these manipulations now are not necessary and are, for simplicity and economy, omitted. This omission is not mandatory, however, and our inventive prehydrogenation treatment can also be applied to a redissolved, previously isolated, coupled rubbery conjugated diene polymer.

Compounding ingredients, such as fillers, dyes, pigments, softeners, reinforcing agents, and the like, can be used in compounding operations. Coupled, hydrogenated, polymers can be used in the fabrication of hoses, belts, extruded and molded goods for diverse applications including those in the building construction, automotive, medical and household article fields.

The disclosure, including data, illustrate the value and effectiveness of our invention. The examples, the knowledge and background of the field of the invention and general principles of chemistry and other applicable sciences have formed the bases from which the broad descriptions of the invention including the ranges of conditions and the generic conditions of operant components have been developed, which have formed the bases for our claims here appended.

We claim:

1. The process of hydrogenation of an organopolyhalide-coupled rubbery conjugated diene polymer which comprises:

treating said organopolyhalide-coupled rubbery conjugated diene polymer as a solution in a hydrocarbon diluent with an effective minor treating amount of an organometal treating agent under treating conditions, wherein said organometal treating agent is represented by $R_aH_bM$ wherein M is selected from the group consiting of lithium, sodium, potassium, magnesium, calcium, zinc, and aluminum, R is a hydrocarbyl radical of 1 to 12 carbon atoms, $a$ is an integer of 1 to 3, and $b$ is 0 or an integer 1 or 2, depending on the valence of M, and thereafter hydrogenating the resulting treated polymer to substantially reduce at least the olefinic unsaturation thereof employing a hydrogenation catalyst and effective hydrogenation conditions, wherein said minor effective amount is sufficient to result in reduced olefinic unsaturation of said coupled conjugated diene polymer after said hydrogenation.

2. The process according to claim 1 wherein in said organometal treating agent represented by $R_aH_bM$ R is a linear alkyl, branched alkyl, cycloalkyl, aryl, or combination thereof; H is hydrogen; $a$ is 1 and $b$ is zero where M is lithium, sodium or potassium; $a$ is 2 and $b$ is zero where M is magnesium zinc, or calcium; $a$ is an integer of 1 to 3 inclusive and $b$ is zero or an integer of 1 to 2 such that the sum of $a$ and $b$ is 3 where M is aluminum.

3. The process according to claim 2 wherein said organometal treating agent is methyllithium, n-butyllithium, sec-butyllithium, tert-butyllithium, n-dodecyllithium di-n-amylmagnesium, dimethylmagnesium, diethylmagnesium, n-amylsodium, 2-ethylhexylpotassium, trimethylaluminum, triethylaluminum, di-n-butylaluminum hydride, 2-ethylhexylaluminum dihydride, triphenylaluminum, benzyllithium, p-tolylsodium, cyclohexyl-bis-(2-ethylpentyl) aluminum, diethylzinc, di-n-amylcalcium, dimethylcalcium or diethylcalcium.

4. The process according to claim 1 wherein said effective amount of said organometal treating agent is in the range of about 0.1 to 25 gram millimoles per 100 grams of coupled polymer, and said treating is conducted at a temperature in the range of about 10° C. to 110° C.

5. The process according to claim 4 wherein said minor effective treating amount of said organometal treating agent is in the range of about 1 to 10 gram millimoles per 100 grams of polymer, and said treating temperature is in the range of about 20° C. to 90° C.

6. The process according to claim 4 wherein said polymer in solution in a hydrocarbon diluent represents a concentration of polymer in said diluent of about 1 to 50 weight percent based on total weight of polymer and diluent.

7. The process according to claim 6 wherein said hydrogenation step employs a heterogeneous hydrogenation catalyst selected from the group consisting of nickel on kieselguhr, Raney nickel, copper chromite, molybdenum sulfite, and finely divided platinum metal on a high surface area carrier.

8. The process according to claim 6 wherein said hydrogenation step employs a homogeneous hydrogenation catalyst comprising (A) a cobalt, nickel, or iron carboxylate, or alkoxide, and (B) an aluminum alkyl compound, wherein said (A) iron, nickel or cobalt carboxylate is represented by $(RCOO)_dM'$, and said alkoxide is represented by $RCH_2OM'$, wherein M' is said nickel, cobalt or iron, $d$ is 2 or 3, wherein said (B) alkylaluminum is represented by $R_3Al$, and wherein said homogeneous hydrogenation catalyst represents a mole ratio of (A):(B) in the range of about 0.15 to 1 to 1 to 1.

9. The process according to claim 8 wherein said homogeneous hydrogenation catalyst component (A) is said carboxylate and is a nickel or cobalt carboxylate, and wherein said homogeneous catalyst component (A) is employed in a concentration of about 0.1 to 20 gram millimoles per 100 grams of polymer, and wherein said hydrogenation is conducted at a temperature in the range of about 0° C. to 250° C., under hydrogen pressurization of up to about 1,000 psig.

10. The process according to claim 9 wherein said organopolyhalide-coupled conjugated diene polymer is a conjugated diene homopolymer, conjugated diene copolymer, or copolymer of at least one conjugated diene with at least one copolymerizable vinylidine monovinylarene group-containing comonomer.

11. The process according to claim 10 wherein said conjugated diene polymer is a homopolymer or copolymer of 1,3-butadiene, 2,3-dimethyl-1,3-butadiene, 3-butyl-1,3-octadiene, isoprene, or 2-phenyl-1,3-butadiene.

12. The process according to claim 10 wherein said conjugated diene polymer is a copolymer of at least one said conjugated diene of 4 to 12 carbon atoms per monomer molecule with at least one monovinylarene of 8 to 18 carbon atoms per monomer molecule, and wherein said monovinylarene is selected from the group consisting of styrene, 3-methylstyrene, 4-propylstyrene, 1-vinylnaphthalene, 4-cyclohexylstyrene, p-tolylstyrene, and 1-vinyl-5-hexylnaphthalene.

13. The process according to claim 12 wherein said conjugated diene polymer is a butadiene/styrene copolymer prepared with bis(4-chloromethylphenyl) ether as said organopolyhalide.

14. The process according to claim 13 wherein said copolymer is a block copolymer represented by a structure of about 15/70/15 styrene/butadiene/styrene.

15. A process for preparing a hydrogenated polymer which comprises the steps of:

a. polymerizing in a hydrocarbon diluent under anionic solution polymerization conditions of temperature and pressure employing a hydrocarbylmonoalkali metal or alkaline earth metal initiator at least one conjugated diene monomer or at least one conjugated diene monomer with at least one copolymerizable vinylidene group-containing comonomer under polymerization conditions, thereby preparing a rubbery conjugated diene polymer, b. treating the resulting conjugated diene polymer from step (a), prior to quenching, with an organopolyhalide coupling agent containing at least two active halogen atoms selected from chlorine and bromine effective to couple said polymer, thereby preparing a coupled conjugated diene polymer, c. treating said coupled conjugated diene polymer with an effective minor amount of an organometal treating agent under treating conditions wherein said organometal treating agent is represented by $R_aH_bM$, wherein M is lithium, sodium, potassium, magnesium, calcium, zinc, or aluminum, and $a$ and $b$ are integers, said effective amount being sufficient to result in reduced olefinic unsaturation of said coupled conjugated diene polymer after hydrogenation, d. hydrogenating said organometal treated coupled conjugated diene polymer under hydrogenation conditions of catalyst, time, temperature, and pressure, effective to substantially saturate at least the olefinic unsaturation of said polymer, thereby producing a hydrogenated polymer.

16. The process according to claim 15 wherein said polymerization employs said at least one conjugated diene monomer wherein said conjugated diene monomer contains 4 to 12 carbon atoms per molecule and is selected from the group consisting of 1,3-butadiene, 2,3-dimethyl-1,3-butadiene, 1,3-pentadiene, 1,3-octadiene, isoprene, 2-phenyl-1,3-butadiene, and 3-n-butyl-1,3-octadiene.

17. The process according to claim 15 wherein said polymerization is said copolymerization of a conjugated diene monomer with a copolymerizable vinylidine group-containing monomer which is a monovinylarene, monopropenylbenzene, vinylnaphthalene, vinylpyridine, vinylquinoline, or vinylisoquinoline.

18. The process of claim 17 wherein said copolymerizable monomer is a monovinylarene, said monovinylarene contains 8 to 18 carbon atoms per molecule, said monovinylarene is selected from the group consisting of styrene, 3-methylstyrene, 4-propylstyrene, 1-vinylnaphthalene, 4-cyclohexylstyrene, p-tolylstyrene, and 1-vinyl-5-hexylnaphthalene, and wherein said conjugated diene monomer contains 4 to 12 carbon atoms per molecule and is selected from the group consisting of 1,3-butadiene, 2,3-dimethyl-1,3-butadiene, 3-butyl-1,3-octadiene, isoprene, 2-phenyl-1,3-butadiene.

19. The process according to claim 15 wherein in said organometal treating agent represented by $R_aH_bM$, R is a linear alkyl, branched alkyl, cycloalkyl, aryl, or combination hydrocarbyl radical; $a$ is 1 and $b$ is zero where M is lithium, sodium or potassium; $a$ is 2 and $b$ is zero where M is magnesium, zinc, or calcium; $a$ is 1, 2 or 3 and $b$ is 0, 1 or 2, such that the sum of $a$ and $b$ is 3, wherein M is aluminum.

20. The process according to claim 19 wherein in said step (c) said effective minor amount is in the range of about 0.1 to 25 millimoles of said organometal treating agent per 100 grams of coupled polymer.

21. The process according to claim 20 wherein said organometallic treating agent is selected from the group consisting of methyllithium, n-butyllithium, sec-butyllithium, tert-butyllithium, n-dodecyllithium, di-n-amylmagnesium, dimethylmagnesium, diethylmagnesium, n-amylsodium, 2-ethylhexylpotassium, trimethylaluminum, triethylaluminum, di-n-butylalminum hydride, 2-ethylhexylaluminum dihydride, triphenylaluminum, benzyllithium, p-tolylsodium, cyclohexyl-bis(2-ethylpentyl)aluminum, diethylzinc, di-n-amylcalcium, dimethylcalcium, and diethylcalcium.

22. The process according to claim 20 wherein the amount of said organopolyhalide coupling agent employed in said step (b) is in the range of about 0.1 to 1.5 equivalents of coupling agent based on alkali metal or alkaline earth metal present in said polymer.

23. The process according to claim 22 wherein said organopolyhalide coupling agent is represented by $R''X_m$ wherein X is chlorine or bromine, $m$ is an integer of at least 2, and $R''$ is a hydrocarbyl or silicon, tin, or oxygen-substituted hydrocarbyl radical, such that said organopolyhalide compound contains not more than 6 halogen atoms per molecule.

24. The process according to claim 23 wherein said organopolyhalide coupling agent is methylene chloride, 1,4-dichlorobutane, 1,4-dichloro-2-butene, ethyltrichlorosilane, 1,3-dichloro-2-propanone, 3,5,5-tribromo-4-octanone, 1,3,5-tri(2-bromoethyl)benzene, benzyltribromosilane, 2,5,6,9-tetrachloro-3,7-decadiene, pentachlorocyclohexyl chloromethylether, tetra(2-chloroethyl)stannane, 2-chloro-4-bromo-5-phenylpentyl pentachlorophenyl ether, or bis(4-chloromethylphenyl)ether.

25. The process according to claim 24 wherein said step (b) approximately one equivalent of coupling agent is employed, and the coupling step is conducted at a temperature in the range of about 0° to 150° C.

26. The process according to claim 23 wherein said hydrogenation step employs a heterogeneous catalyst selected from the group consisting of nickel on kieselguhr, Raney nickel, copper chromite, molybdenum sulfite, and finely divided noble metal on a high surface area carrier.

27. The process according to claim 23 wherein said hydrogenation step employes a homogeneous catalyst system comprising (A) a cobalt, nickel, or iron carboxylate or alkoxide, with (B) an aluminum alkyl compound, in an effective ratio of (A):(B), and wherein said (A) cobalt, nickel, or iron carboxylate is represented by $(RCOO)_dM'$, and said alkoxide is represented by $RCH_2OM'$, wherein M' is said iron, nickel, or cobalt, $d$ is 2 or 3, and R is a hydrocarbyl radical of 1 to 12 carbon atoms.

28. The process according to claim 27 wherein said (A) carboxylate or alkoxide is selected from the group consisting of nickel, iron, or cobalt acetate, propionate, benzoate, octanoate, butoxide, and isopropoxide; and wherein said (B) alkyl aluminum is selected from the group consisting of triisobutylaluminum, triethylaluminum, and tripropylaluminum, wherein said ratio of said (A):(B) is in the range of about 0.15:1 to 1:1, and wherein said hydrogenation is carried out at a temperature in the range of about 0° C. to 250° C., employing a hydrogenation pressurization of up to about 1,000 psig.

29. The process according to claim 28 wherein said coupled conjugated diene polymer is a block copolymer of butadiene and styrene.

30. The process according to claim 29 wherein said block copolymer represents a styrene/butadiene/styrene block copolymer composition of about 15/70/15 weight relationship, prepared employing bis(4-chloromethylphenyl) ether as organopolyhalide coupling agent, and said hydrogenation step employes nickel octanoate and triethylaluminum in a 1:2 nickel:aluminum atom ratio.

31. The process according to claim 20 wherein said hydrogenation step (d) substantially saturates aromatic unsaturation as well as olefinic unsaturation.

* * * * *